United States Patent
Meadows

(10) Patent No.: US 6,574,843 B1
(45) Date of Patent: Jun. 10, 2003

(54) METHOD AND APPARATUS FOR INSTALLING AND REPLACING VALVE STEMS

(76) Inventor: Thomas J. Meadows, 124 Jessica Ct., Leesport, PA (US) 19533

( * ) Notice: Subject to any disclaimer, the term of this patent is extended or adjusted under 35 U.S.C. 154(b) by 19 days.

(21) Appl. No.: 09/903,842

(22) Filed: Jul. 12, 2001

(51) Int. Cl.[7] .......................... B60C 25/18; B25B 27/24
(52) U.S. Cl. .................. 29/33 N; 29/221.5; 29/264; 29/235; 29/267; 29/890.121; 29/426.5
(58) Field of Search ................. 29/221.5, 264, 29/235, 890.121, 890.123, 890.124, 426.5, 267, 33 R, 566, 566.1, 33 K, 33 N; 81/15.7

(56) References Cited

U.S. PATENT DOCUMENTS

| | | | |
|---|---|---|---|
| 2,050,005 A | * | 8/1936 | Heegeman .................... 29/263 |
| 2,318,115 A | | 5/1943 | Tubbs |
| 2,438,642 A | | 3/1948 | Martin |
| 2,495,040 A | * | 1/1950 | Walden ...................... 29/221.5 |
| 2,562,419 A | * | 7/1951 | Ferris ..................... 29/243.519 |
| 2,652,858 A | | 2/1953 | Snyder |
| 2,839,120 A | | 6/1958 | McCord |
| 2,844,183 A | | 7/1958 | McCord |
| 2,845,980 A | | 8/1958 | Williams |
| 2,874,750 A | | 2/1959 | Boyer |
| 2,966,190 A | * | 12/1960 | Nowotny ..................... 81/15.7 |
| 2,968,333 A | | 1/1961 | Ayres |
| 2,990,736 A | * | 7/1961 | Crandall ...................... 81/15.7 |
| 3,255,520 A | | 6/1966 | Jerdon |
| 3,387,354 A | | 6/1968 | Mossberg |
| 3,458,895 A | | 8/1969 | Miller |
| 3,462,988 A | * | 8/1969 | Tudor .................... 29/243.519 |
| 3,511,295 A | | 5/1970 | Kilmarx |
| 3,631,746 A | * | 1/1972 | Rorog ......................... 81/15.7 |
| 3,734,158 A | | 5/1973 | Bennett et al. |
| 3,740,814 A | * | 6/1973 | Marshall ...................... 29/264 |
| 3,750,258 A | | 8/1973 | Sampo |
| 3,833,995 A | * | 9/1974 | Rutledge ................... 29/221.5 |
| 3,863,697 A | | 2/1975 | Brown |
| 4,275,622 A | | 6/1981 | Ford |
| 4,528,735 A | | 7/1985 | Eastridge et al. |
| D282,713 S | | 2/1986 | Flory et al. |
| 4,765,048 A | | 8/1988 | Hokanson |
| 4,765,049 A | * | 8/1988 | Lundquist .................... 29/235 |
| 4,807,343 A | | 2/1989 | Wadsworth |
| 4,920,625 A | * | 5/1990 | Smith .......................... 29/264 |
| 5,097,580 A | | 3/1992 | Story |
| 5,211,782 A | | 5/1993 | Thelen |
| 5,636,436 A | | 6/1997 | Martin |
| 5,682,660 A | * | 11/1997 | Hansen ........................ 29/264 |
| D399,107 S | | 10/1998 | Murray |

FOREIGN PATENT DOCUMENTS

| | | | | |
|---|---|---|---|---|
| DE | 29705907 U1 | * | 7/1997 | |
| FI | 26501 A | * | 3/1954 | ................ 29/221.5 |
| GB | 794844 A | * | 5/1958 | ................ 29/221.5 |
| JP | 9-220914 A | * | 8/1997 | |

* cited by examiner

*Primary Examiner*—A. L. Wellington
*Assistant Examiner*—Erica E Cadugan
(74) *Attorney, Agent, or Firm*—Charles A. Wilkinson, Esq.; Clinton H. Wilkinson. Esq.

(57) ABSTRACT

A method and apparatus for installing and replacing a valve stem from the valve stem rim opening defined in the rim of a tubeless tire from the outside of the rim, such tool including a threaded rod for engaging the valve stem and pulling the valve stem through an inwardly tapered first tube into a second tube dimensioned to fit into the valve stem rim opening, the flange of the valve stem is gradually compressed, and after the tapered tube is removed the second tube is placed in the rim opening and the valve stem is pushed into the valve stem opening using only manual force.

21 Claims, 8 Drawing Sheets

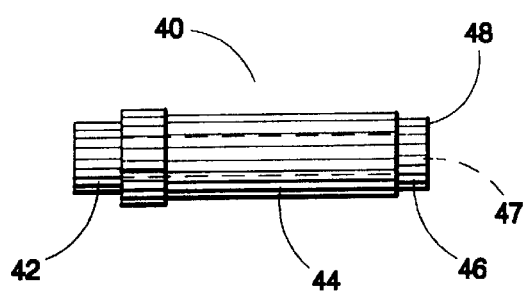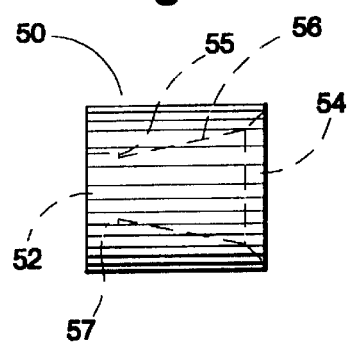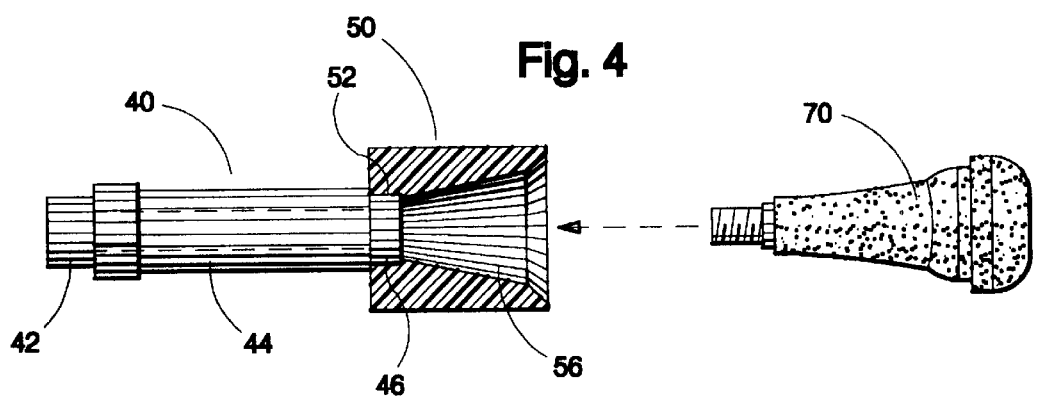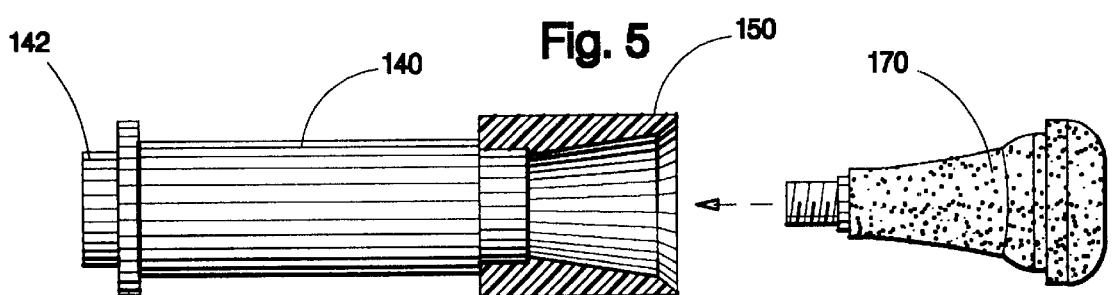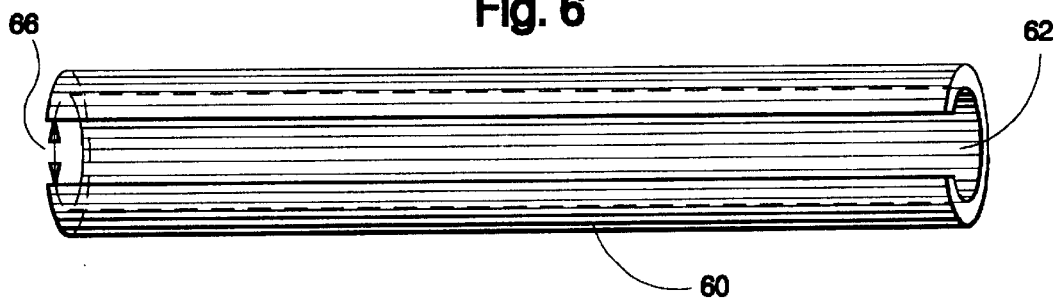

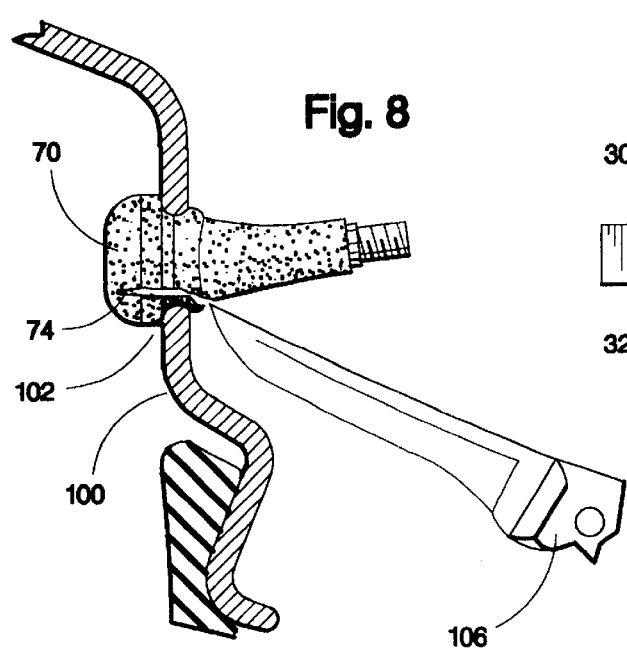
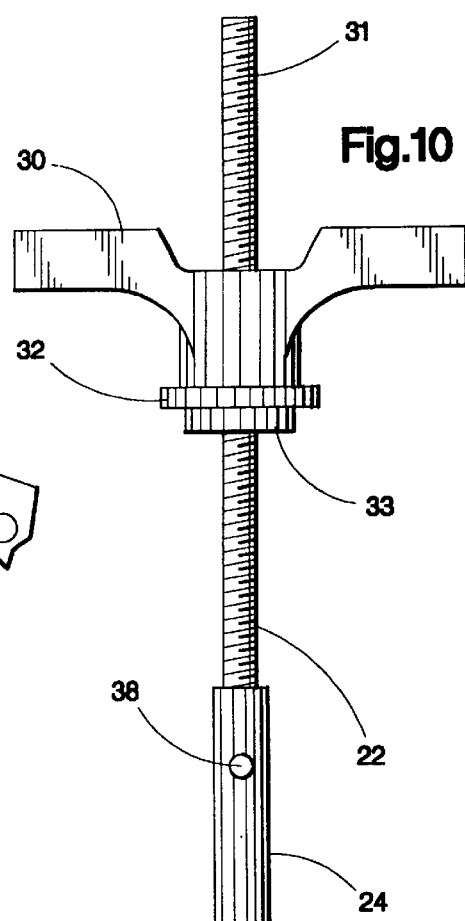
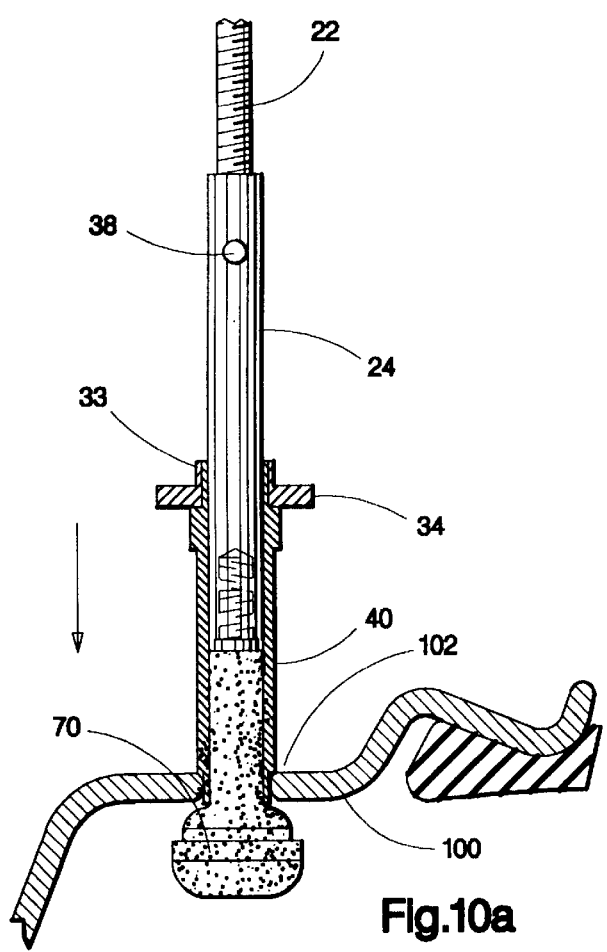
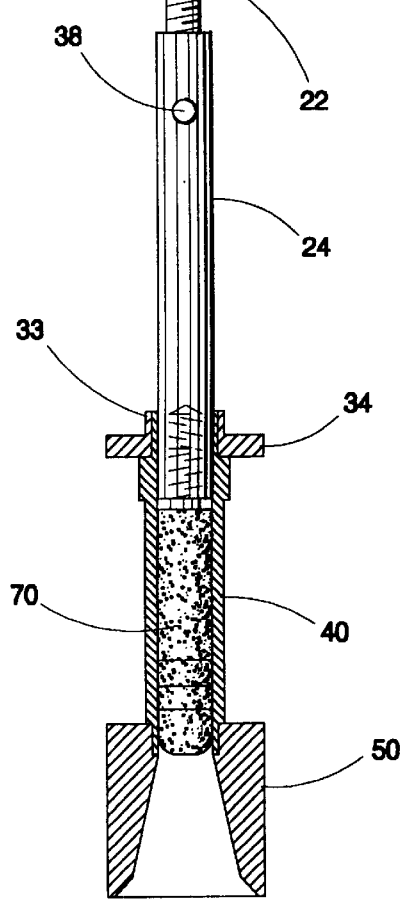

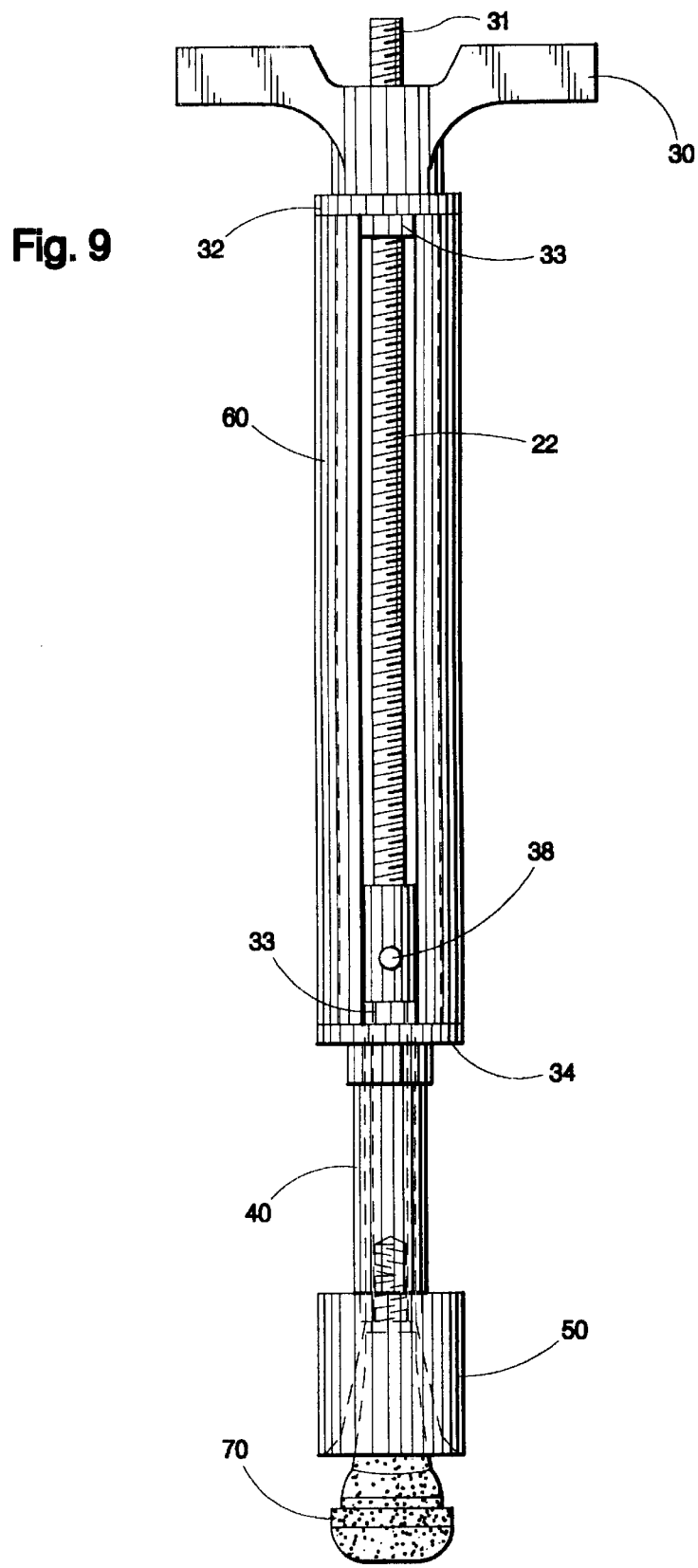

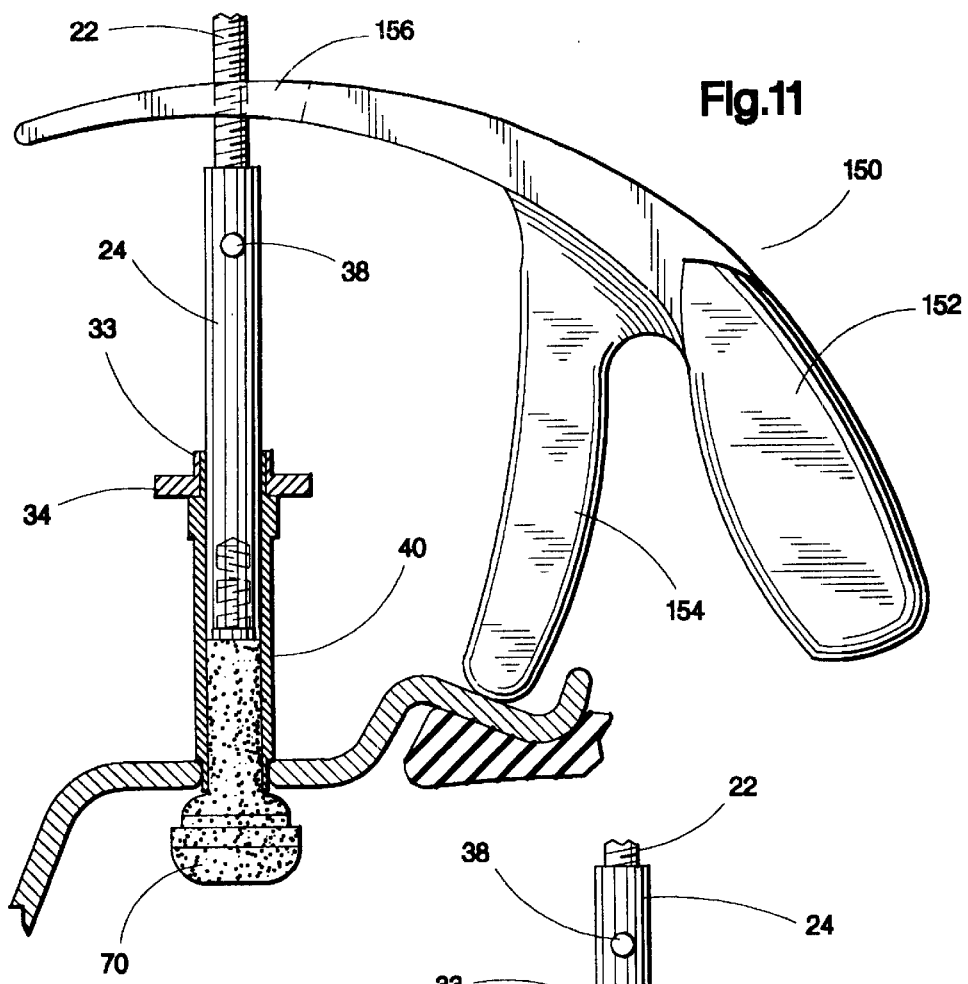
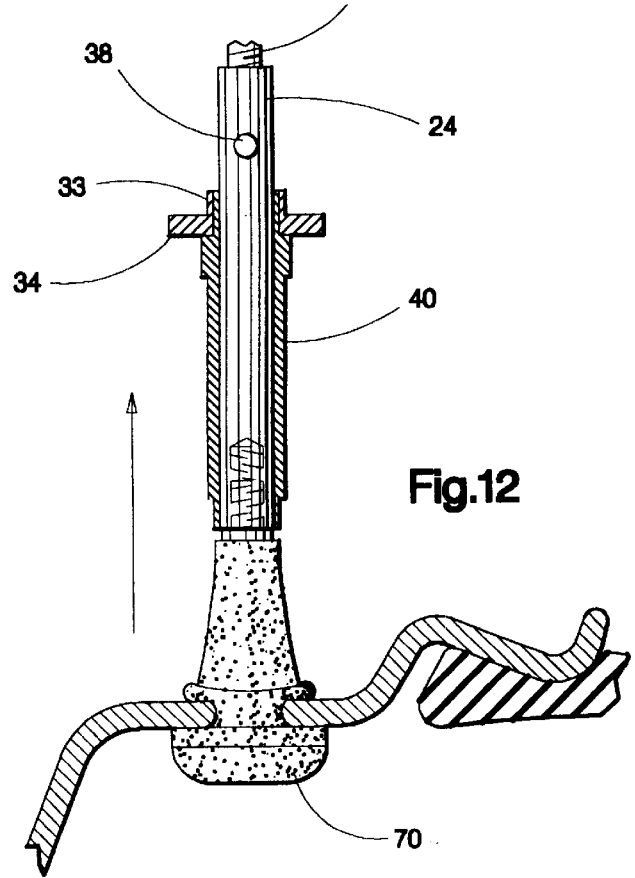

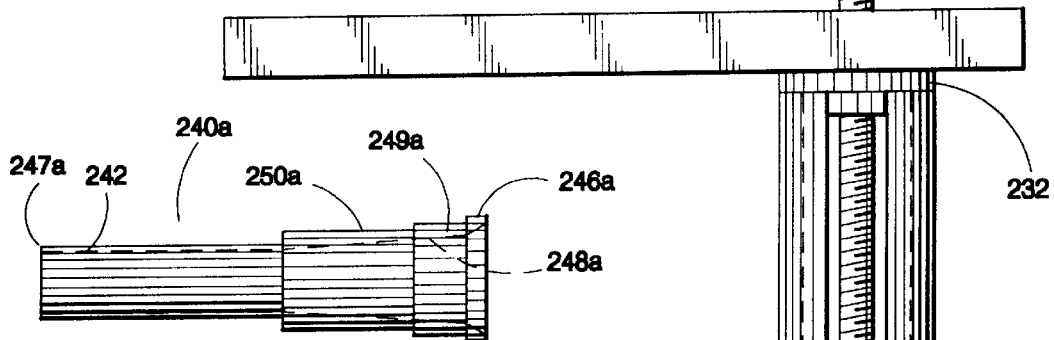
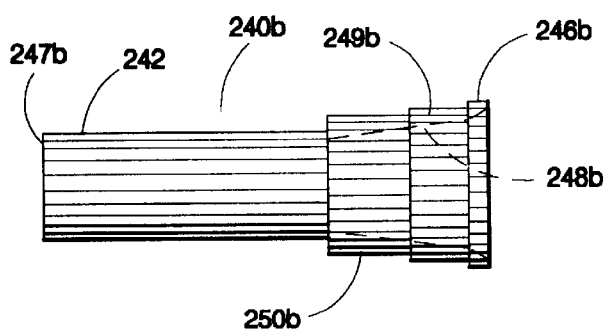
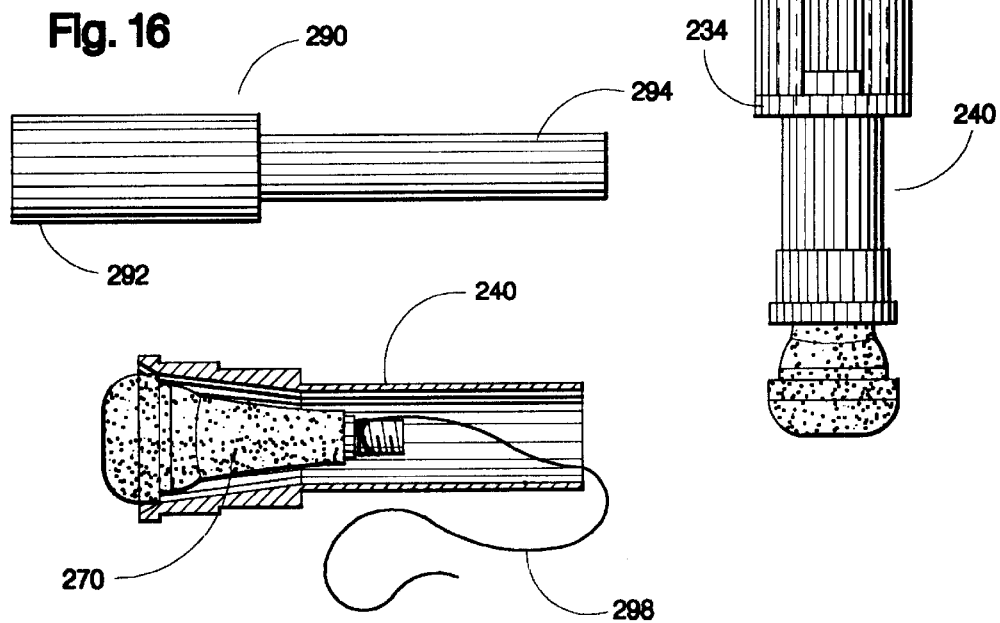

METHOD AND APPARATUS FOR INSTALLING AND REPLACING VALVE STEMS

BACKGROUND OF THE INVENTION

1. Field of the Invention

This invention relates to tools for installing and replacing tubeless tire valve stems, and more particularly to a method and apparatus for installing and replacing tubeless tire valve stems without requiring removal or separation of the tire from the wheel rim.

2. Preliminary Discussion

Tubeless or pneumatic tires were first introduced in 1947 by B.F. Goodrich, Inc. Such tubeless tires have an inner rubber liner rather than a separate inner tube, and incorporate a rim bead, a stiffened molded edge section, usually formed by high tensile steel wire hoops embedded in the two inner edges of the tire. The bead conforms to and fit against the rim seat or inner ledge portion of a vehicle's wheel rim to hold the tire to the rim. Upon inflation, an airtight seal between the rim seat and the tire bead is created. Provided there is no defect in the rim or tire, once the tire is properly inflated on the rim with a tight uniform seal between rim seat and the tire bead, there is no way for air to be forced into or out of the wheel, except through an inflation valve.

Since there is no inner tube, the inflation valve stem is usually secured in an annular opening provided through the rim for the valve. Conventional tubeless tire valve stems are comprised of an elastic rubber body or casing, which casing houses a valve core, typically comprised of a spring biased valve mechanism. The rubber casing typically includes an upper portion surrounding the protruding metal threaded end of the valve core, which portion can pass readily through the rim opening and may be slightly downwardly and outwardly tapered. The upper portion merges toward its lower end opposite the threaded end with a conical portion of rapidly increasing diameter, the conical portion being adjacent to or accommodating at its lower end an annular bead with a diameter slightly larger than the diameter of the rim opening. Below the annular bead is a substantially annular flat-bottomed groove sized to cooperate with and sealingly interfit with the rim opening. Finally, such annular flat-bottomed groove portion merges at its lower end into an enlarged annular flange or bulbous head having a substantially larger diameter than the rim opening.

Ordinarily, valve stems are installed from the inner side of the rim by pulling the valve, threaded end first, through the rim opening using a suitable pulling tool until the bulbous head of the valve stem is seated against the inner, or tire, side of the rim and the flat-bottomed annular groove is seated or secured in the rim opening. The inherent elasticity of the rubber body seats or anchors the valve in the rim opening, and in addition, since in most valve stems the valve is not bonded tightly or directly to the enlarged head or base, such head will resist dislodgment by the high pressure within the tire since it can mushroom outwardly along the inner side of the rim.

The valve stems just described are commonly used because they are relatively inexpensive, easy to install, light, and wear well. However, eventually they may become deformed, bent, or cracked, or the rubber casing will begin to lose its elasticity and leak. Tire valve stems on trucks, farm equipment or other construction-type vehicles may also experience more severe damage at a higher rate than a typical valve stem on a passenger vehicle. Since the bulbous head portion cannot be easily forced through the rim opening from the outer side of the rim without damaging the rubber casing, in most cases, when it is required to remove or replace an inflating valve stem, the tire must be unseated or dislodged from the rim in order to gain access to the inside or tire side of the rim, thereby breaking the airtight seal between the bead seat and bead. Since special equipment is usually required to correctly seal a tubeless tire to a rim, and every time the seal is broken there is an increased likelihood of later leaks, the removal of the tire from the rim can result in prolonged downtime and significantly delay or hinder use of the vehicle. Thus, there is a need for an improved tool wherein a cracked, bent, or otherwise damaged valve stem can be replaced "in the field" without requiring that the tire be removed from the rim and wherein the valve stem could be inserted into the rim opening of a tubeless tire from the outer side of the rim and tire, rather than from the inner side.

3. Description of Related Art

Numerous tools and methods for repairing damaged valve stems without requiring that the tire be unseated from the rim are known. For example, U.S. Pat. No. 2,652,858 issued to R. V. Snyder entitled "Repair Unit for Tire Valve Stems," teaches a method wherein the damaged portion of the stem is cut away or removed and a repair unit is clamped over the undamaged or remaining portion of the stem. In U.S. Pat. No. 3,863,697 issued to R. C. Brown, entitled "Instant Valve Insert," the entire stem except for the old valve plug is broken off and a new valve having an anchoring means is slipped through and secured to such plug. While such solutions are useful in an emergency, they only provide temporary relief, and still require that eventually a new stem be inserted from the inner side of the tire in the usual manner.

U.S. Pat. No. 3,255,520 issued to J. A. Jerdon, entitled "Automobile Tire Stem Removing and/or Inserting Tool," discloses a lever having a pivot, wherein the end of a valve stem is screwed to a threaded rod attached on the end of the lever, and wherein the lever is used to forcibly pull a valve out of the rim opening. Although such device is apparently useful in removing valve stems, it would be difficult if not impossible to use such device to push a stem through the rim opening without tearing or damaging the rubber casing covering the stem, which casing is not compressed prior to insertion.

Other known valve stem installing tools include various means for forcing a stem down an elongated and sharply tapered nozzle, such as U.S. Pat. No. 3,750,258 issued to J. J. Sampo, entitled "Insertion Tool for Tire Valve Stems," and U.S. Pat. No. 4,765,048 issued to B. M. Hokanson, entitled "Valve Stem Inserter." Such tools force the stems through long tapered nozzles having an inner diameter on the far end that is less than the diameter of a rim opening using a pusher rod or other pushing tool, thereby gradually compressing the bulbous flange of the stem such that it may be inserted into the rim opening from the outside. Although such tools employ a lubrication means, they are generally difficult to operate since a very large amount of force is required to compress the flange and gradually push the stems down the tapered nozzles. Other similar devices employ some additional means to facilitate forcing of the stems down a tapered nozzle. For example, U.S. Pat. No. 3,387,354 issued to H. J. Mossberg, entitled "Valve Inserting Device," employs a pusher rod attached to a notched trigger handle. U.S. Pat. No. 4,807,343 issued to T. P. Wadsworth, entitled "Tubeless Tire Valve Stem Inserter," also employs a trigger mechanism, attached to a pusher rod using grips to force the rod forward. Finally, U.S. Pat. No. 5,097,580 issued to A. J.

Story, entitled "Apparatus for Installing and Removing Valve Stems," discloses a valve insertion and removal tool having a tapered elongate tubular body, with the top end fitted to an air piston assembly. Although such a device would make it easier to force the stem down a tapered tube, it is only useful in a garage or other area where a suitable source of power for the operating piston is available.

While valve assemblies for tubeless tires that can be installed from the outer side of the rim are also known, such as disclosed in U.S. Pat. No. 5,211,782 issued to D. Thelen, entitled "Valve Assembly for Tubeless Tire," such alternative valve structures are more expensive and generally are less preferred than standard tubeless tire valves. Thus, despite the continued progression of the prior art, there is still a need for an inexpensive tool that can be used to manually insert and/or remove standard valve stems from the rim opening of a tubeless tire quickly and easily and without damaging the rubber casing covering the stem.

The present inventor through trial and error has developed a tool which overcomes many of the disadvantages of prior valve insertion tools. In the preferred embodiment of the invention, rather than pushing the valve stem down an elongated, tapered nozzle, the present inventor utilizes an untapered tube sized to fit into a wheel rim opening in combination with a short tapered attachment, which allows the stem when lubricated to be easily pulled, rather than pushed, into the untapered tube. Such pulling motion is accomplished simply by attaching the valve stem to a threaded rod, which when turned in conjunction with a holding member, easily pulls the stem through the tapered attachment into the untapered tube. Thus, using the present invention, it is no longer necessary to force the stem down an elongated tapered sleeve to the bottom edge of said sleeve, since the stem is simply pulled into the sleeve from the rim insertion end through a short tapered attachment. Such attachment is then removed, and the stem is in position to be inserted into the rim opening. Of equal importance and significance to the invention is the fact that due to the ease of use, no supplemental devices such as trigger mechanisms, ratchet systems, pistons, or other power sources are required to accomplish the method. Such tool can also be used to easily remove a cracked or leaking valve stem. Finally, the invention is significantly less inexpensive to manufacture and produce in comparison prior art insertion tools.

OBJECTS OF THE INVENTION

It is an object of the present invention to provide a method and apparatus for installing and replacing valve stems in the rims of tubeless tires.

It is a further object of the present invention to provide a tool which can be used to insert and remove valve stems from the outer side of a tire rim, rather than the tire side.

It is a still further object of the present invention to provide a tool for installing valve stems which does not require that the wheel be removed from the vehicle or that the tire be unseated from the rim during such installation.

It is a still further object of the present invention to provide a tool which is simple and inexpensive to manufacture, easy to use, and does not require an outside power source to operate such tool.

It is a still further object of the present invention to provide a tool which can be used to install or remove valve stems of various sizes.

It is a still further object of the present invention to provide a tool which allows a relatively unskilled vehicle operator to replace a tubeless tire valve without the cost of time and labor associated with hiring a skilled professional to remove the wheel, unseat the tire, change the valve stem, reseat the tire, and replace the wheel.

It is a still further object of the invention to provide a method of replacing tubeless tire valves which when used with appropriate equipment can be carried out easily and quickly by unskilled labor or the owner of a vehicle him or herself.

It is a still further object of the invention to provide a method of replacing the valve stem in a tubeless tire without requiring access to the tire side of the rim and without any complicated or costly equipment.

It is a still further object of the invention to provide a simple, safe and effective method and apparatus by the use of which the valve stems of tubeless tires may be replaced without dismounting the tire.

Still other objects and advantages of the invention will become clear upon review of the following detailed description in conjunction with the appended drawings.

SUMMARY OF THE INVENTION

An improved method and means for replacing damaged and defective valves in tubeless tires without having to remove the tire from the rim is provided in which, after the old or defective valve stem is removed from the tire, preferably by pulling from the tire by use of a threaded puller rod comprising a portion of the new valve insertion apparatus of the invention, the new valve sized to replace the old valve is threaded onto the end of a thin rod provided with a force or leverage handle at the end and dimensioned to pass through an insertion tube having an end dimensioned to fit into the valve opening in the tire rim and an opposite end having a larger diameter and an internal beveled or funnel shape leading into a reduced internal diameter portion. The pulling rod is passed through the insertion tube from the smaller end and attached by matching internal threads to the external threads of the new valve stem, the exterior of the valve stem is lubricated and then through the application of tension applied to the pulling rod, the valve stem is pulled through the conical section of the insertion tube into the main section of the insertion tube which has a slightly lesser diameter than the rim opening. The small end of the insertion tube is then placed in or adjacent to the rim opening and the valve stem is pushed from the insertion tube into the exterior of the tire. The insertion tube is then removed from the rim opening and the pulling rod is used to pull the valve stem back through the rim opening until the annular seat groove adjacent the enlarged end of the valve seats in the rim opening. The pulling rod is then unthreaded or unscrewed from the valve threads and removed, leaving the new valve stem seated in place.

In a preferred and improved embodiment of the invention, the increased diameter section of the insertion tube containing the beveled conical or funnel shaped interior section is a separate piece which can be removed from the end of the insertion tube after the resilient or rubbery portions of the valve stem is completely drawn into or encompassed in the insertion tube. The end of the insertion tube is then placed in the rim opening and the pulling rod, which is still threaded onto the valve stem, is then used to push the valve stem through the rim opening. The insertion tube is then pulled up, or the pulling rod and such rod is used to pull the valve stem back through the rim opening until it seats in such rim opening whereupon the pulling rod is unscrewed from the pulling rod and the installation of the new valve stem is complete.

In the earlier and less preferred embodiment of the invention, the conical or funnel shaped interior section of the insertion tube is contained in a permanent enlarged portion of the insertion tube and as a result, after the valve stem is pulled into insertion tube, the pulling rod is unscrewed from the valve stem, the opposite smaller end of the insertion tube is placed in the rim opening after a strong line such as nylon line is tied to the threads of the valve stem and a special pusher rod or alternatively the end of the puller rod, is used to push the valve stem through the rim opening into the interior of the tire. The thin line is then used to retrieve the valve stem and draw its threaded end back to the rim opening whereupon the pulling rod is re-threaded to the valve stem and is pulled back through the rim opening as in the first embodiment until seated in the opening.

BRIEF DESCRIPTION OF THE DRAWINGS

FIG. 2 is a view of a preferred inserter tube of the valve stem insertion and removal tool of the invention shown in FIG. 1.

FIG. 3 is a view of the tapered attachment member of the valve stem insertion and removal tool of the invention shown in FIG. 1.

FIG. 4 is a side view partially in section of the inserter tube and tapered attachment member shown in FIGS. 2 and 3 showing a valve stem about to be inserted into such device.

FIG. 5 is a side view also partially in section of another preferred inserter tube and attachment member for use with the invention for accommodating a valve stem having slightly greater dimensions again with a larger valve stem about to be inserted into such device.

FIG. 6 is a perspective view of the pulling rod holding device of the tool shown in FIG. 1.

FIG. 8 is a close-up view partially showing a cut being made in the rubber flange of a faulty valve stem during the removal process shown in FIG. 7.

FIG. 9 is a view partially in phantom of the preferred embodiment of the valve stem insertion and removal tool with a new valve stem secured to the pulling rod and about to be pulled into the insertion tube.

FIG. 10 is a side view partially in section of the inserter tube with a valve stem completely pulled into the inserter tube.

FIG. 10a is a side view similar to FIG. 10 with the valve stem now pushed partially out of the inserter tube and into the rim hole by the device of the invention.

FIG. 11 is a view of an alternative pivot handle structure for use with the invention in moving the pulling rod.

FIG. 12 is a view of the invention showing the pulling rod attached to the valve stem similar to FIG. 10a with the valve stem pulled upwardly into a "snapped" position or seated in the rim hole.

FIGS. 13a and 13b show an alternative embodiment of the inserter tubes of the invention having an integral rather than removable tapered end.

FIG. 14 is a side view of one of the alternative inserter tubes shown in FIGS. 13a and 13b attached to the valve stem Insertion and removal device of the invention similar to FIG. 9 but also having an alternative handle member.

FIG. 15 is a cut away view of one of the inserter tubes with a thin cord attached to the threaded end of a valve stem.

FIG. 16 is view of the pusher device used to push the valve stem into the tire rim using the alternative embodiment of the invention.

DESCRIPTION OF THE PREFERRED EMBODIMENTS

Figure 1:
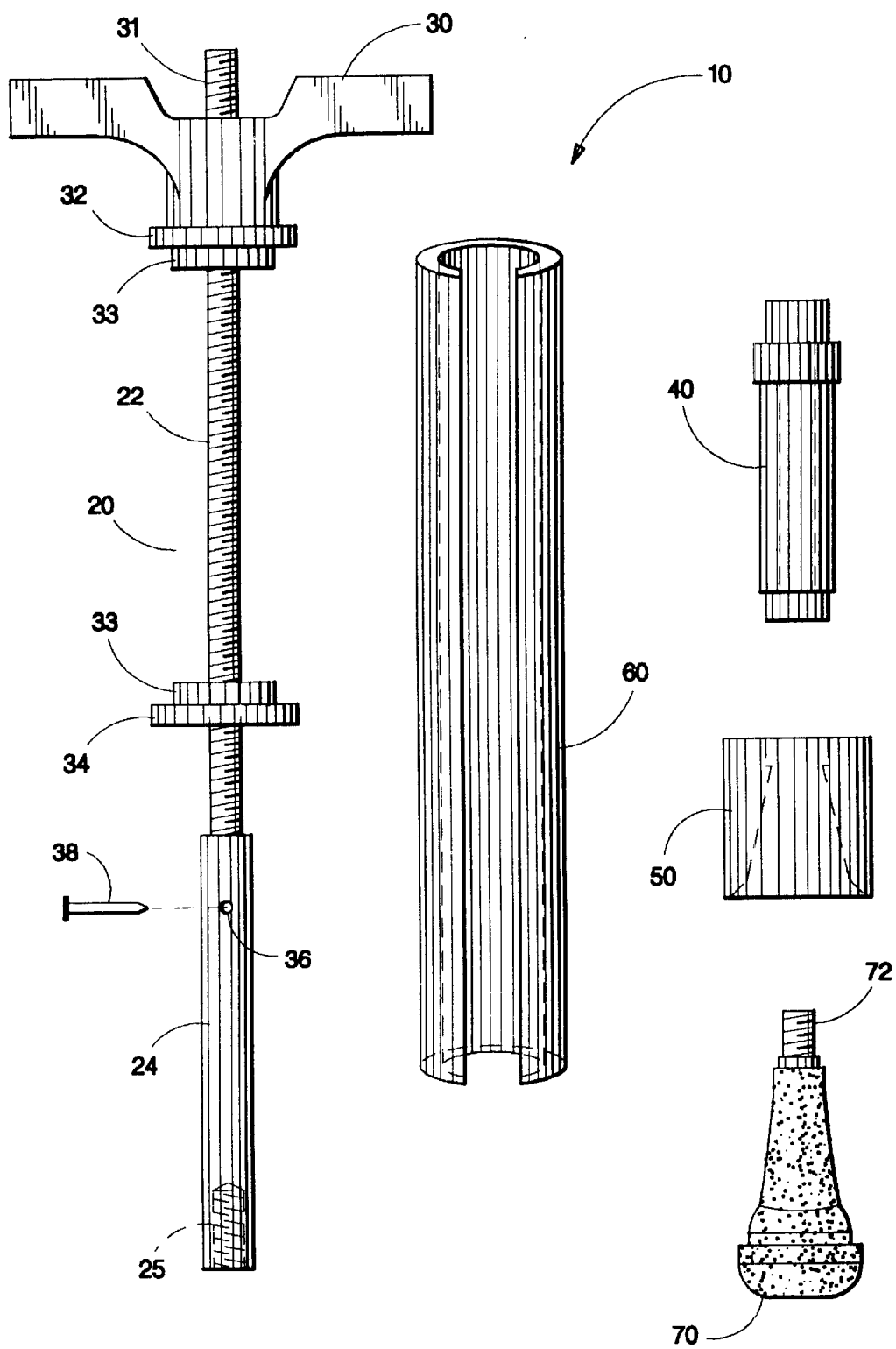
FIG. 1 is a perspective view of the partially disassembled parts of the preferred embodiment of the valve stem insertion and removal tool of the invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Tubeless or pneumatic tires are made in a variety of sizes to accommodate vehicles having different weight requirements and uses. As a result, a standardized code has been developed to distinguish between such tires, in the form Axxx/yyBzz. A designates the type of vehicle the tire is made for, such as passenger vehicles (P) or light truck (LT); xxx denotes the tire width in millimeters; yy denotes the aspect ratio, or the ratio of the tire's height to width; B indicates the type of construction of the tire, which is usually radial-ply construction (R); and zz denotes the wheel-rim diameter in inches. In addition, since different sized tires normally require different sized valve stems, there are five standard sizes of passenger car tubeless tire valves, coded TR 412, TR 413, TR 414, TR 415, and TR 418. As an example, a TR 412 valve has an overall length of 33 millimeters, a TR 414 has a length of 48.5 millimeters, and a TR 418 a length of 61.5 millimeters. Other dimensions of the valves, such as the diameter of the portion which engages the rim opening, also vary depending upon the size of the rim opening of a particular wheel. The present invention can be used to simply and quickly replace leaking or faulty tubeless tire valve stems from a wheel rim without having to remove the wheel or breaking the seal between the tire and rim. While other valve insertion devices are known in the prior art, none are as simple to use and as inexpensive to manufacture as the present inventor's device.

The present invention provides a simple and easy-to-use method and apparatus for removing a cracked or faulty valve stem and replacing it by installing a new valve stem into the rim opening of a tubeless tire wheel rim from the outside of the rim so that the tire does not have to be unseated from the rim in order to insert such new valve. In the preferred embodiment, the insertion and removal tool is comprised of a threaded inserter or pulling rod, an untapered inserter tube and detachable tapered inserter tube cap, a pair of plastic spacers or bushings, and a holder device. The inserter rod is essentially comprised of an externally threaded rod section, bar section, and handle section, with the forward end of the bar section being internally threaded for receiving the threaded end of a valve stem, and the handle section threadably attached to the upper end of the rod. The plastic bushings are used secure the holder device around the rod. The holder device is preferably cut from an ABS plastic tube, and preferably has a cut-away portion to facilitate insertion of the rod into the holding device. A member such as a nail is used to prevent the holder from turning in relation to the rod when the device is in use.

Briefly, in accordance with the invention, after an old or damaged inflation valve or valve stem is removed from a tubeless tire rim, a new valve stem is pulled while lubricated into an inserter tube having an external diameter at one end smaller than the valve opening in the tire rim. A puller rod having an internal thread matching the external thread of the tire stem and a diameter less than the inserter tube is threaded onto the valve stem and used to pull the tire stem into the inserter tube through a beveled or conical end of the inserter tube. As the valve stem is pulled through the beveled or conical interior portion of the inserter tube, the resilient or rubber portions of the valve stem are compressed until they are of lesser diameter than the rim opening. After being drawn into the inserter tube, the small end of the tube is placed in the rim opening and the valve stem pushed from the inserter tube into the tire and is then pulled back through the rim opening while threaded on the puller rod until seated in position in the rim opening.

In a preferred embodiment of the invention, the valve stem is pulled into a removable beveled fitting at the end of the inserter rod and such beveled fitting is then removed, allowing for the same end of the inserter tube to be inserted through the rim opening whereupon the valve stem is pushed out of the inserter tube into the tire still threadedly attached to the puller rod, which is then used to pull the valve stem back through the rim opening until seated in the opening. In a less preferred earlier embodiment of the invention, the beveled portion of the inserter tube is integral with the tube, so that after the valve stem is pulled into the inserter tube, the puller rod is unthreaded from the valve stem and the valve stem is then pushed by the rod, applied or inserted, from the other end, or more preferably by a special pushing bar or stud, through the rim opening into the tire after having had a thin cord or line tied to the threads. Once the valve stem is in the tire, the thin cord or line is used to draw the threaded end back to the rim opening, the pulling rod is re-threaded or attached to the threaded portion of the valve stem, and the valve stem is pulled then pulled by the puller rod partially through the rim opening until seated in the opening.

More particularly, in accordance with the preferred embodiment of the invention, an inserter tube and tapered cap are used to gradually pull the valve stem through the tapered cap into the inserter tube, uniformly compressing the rubber casing of the valve stem so that it can be inserted into the rim opening from the outside of the rim. The tapered inserter tube cap has an inwardly tapered inner peripheral wall at one end, with the diameter of the inner peripheral wall at the opposite end being equal to or slightly smaller than the inner diameter of the insertion end of the inserter tube to provide for continuous smooth entry of the valve stem into the tube. At least one end of the inserter tube should be dimensioned to fit into a particular valve stem rim opening. Inserter tubes having different diameters can be used with the invention, depending upon the size and diameter of the rim hole and valve stem to be inserted.

In utilizing the valve stem inserter of the invention, first the old or existing valve must be removed from the wheel rim. This is accomplished by liberally applying a lubricant around the old valve stem and rim opening, making sure that the lubricant is worked into the space between the valve stem and rim hole. Next, the pulling rod is threaded to the old valve stem, and a generally upward force is applied to pull or stretch the old valve stem. While stretching the old valve stem, a small knife blade may be wedged into the rim opening and used to cut into the rubber casing and flange on the old valve stem, particularly the enlarged head portion, decreasing its rigidity and structural integrity and enabling the old valve stem to be pulled out of the rim hole more easily. Alternatively, if sufficient tensional force is applied to the old valve stem, the bulbous lower end will be stretched and simultaneously compressed and slip through the valve opening in the rim.

To insert a new valve stem using the preferred embodiment of the invention, first the bar section of the inserter rod is inserted through the inserter tube and tapered cap and threadably secured to the new valve stem. Next, first making sure that sufficient lubricant is applied around the stem and the inner wall of the inserter tube and cap, the rod is then placed in the holder, which is secured to the rod by quickly turning the handle in a clockwise direction, with a short rod such as a nail or other suitable stud member inserted in an aperture in the bar section of the rod and extending perpendicularly outward from the rod to prevent the rod from rotating in relation to the holder. The handle is then further turned in a clockwise direction, causing the new valve stem to be gradually pulled upwardly through the tapered cap into the inserter tube. After the flange or head of the valve stem has been compressed and completely pulled through the tapered cap into the inserter tube, the tapered cap and holder are removed and the end of the inserter tube is positioned in the valve stem opening of the wheel rim from which the original valve stem has been removed. Next, using only downward manual force on the handle and while continuing to hold or steady the inserter tube in the rim opening, the valve stem is easily pushed out of the inserter tube as well as through the rim opening into the tire, still attached to the handle and rod. The inserter tube is then pulled upwardly until clear of the rim opening. Finally, the handle is pulled upwardly pulling the valve stem upwardly into the rim opening, until the valve stem "snaps" into position in the rim hole, and the pulling rod is removed by turning to unthread the valve from the valve stem. An alternative pivoting type handle may also be used when inserting the valve stem into the wheel rim.

In a slightly less preferred version of the invention, rather than using a detachable tapered cap, such tapered portion may be formed integrally with the inserter tube. After the valve stem has been pulled into the inserter tube by the pulling rod in the manner previously described, the threaded rod is detached from the valve stem and a thin nylon cord is attached to the threaded end of the valve stem or to the valve stem cap. A length of slack cord attached to the valve stem is pushed into the rim opening adjacent the inserter tube, with the valve stem being in an inverted position. Preferably, a special pusher rod is used to force the valve stem out of the inserter tube and into the tire. After the inserter tube and pusher rod are removed, the valve stem is pulled back through the rim opening by the cord, automatically causing the valve stem to be inverted into correct position whereupon it can be pulled to or partly through the rim opening. Finally, the pulling rod is re-threaded to the valve stem and upward pressure is applied on the pulling rod until the valve stem "snaps" into place in the rim hole as in the first embodiment, and the pulling rod is removed. The device of the invention allows a faulty valve stem to be quickly and easily removed and replaced with a new valve without requiring any expensive tools or additional outside power source, and is particularly useful in an emergency or, for example, in connection with heavy equipment where valve stems may be damaged more easily and where it is more costly and more time consuming to remove the tire from the rim.

FIGS. 1 through 12 illustrate the various features of a preferred embodiment of the invention, while FIGS. 13 through 18 illustrate a slightly less preferred alternative embodiment. Reference is now made to FIG. 1, which shows the various parts of the valve stem inserter device 10 of the invention. The major components of inserter device 10 include inserter or pulling rod 20, handle 30, inserter tube 40, tapered inserter tube cap 50, rod holder 60, and tire valve stem 70. Rod 20 is comprised of two main sections; threaded rod section 22 and bar section 24. Threaded rod section 22 is permanently attached at one end to the proximal end 23 of bar section 24 by a Lucite thread holder or binder, although other known welding or locking means for joining rod section 22 with bar section 24 may also be used. In the preferred embodiment, threaded rod 22 is preferably made from an approximately ¼ inch by 20 inch zinc plated rod approximately 6⅛ inches long. Bar section 24 preferably has a length of approximately three inches and a diameter slightly greater than the diameter of threaded rod section 22. Although the exact dimensions of rod section 22 and bar section 24 can be varied, the diameter of pulling rod 20 should be at least slightly smaller than the inner diameter 47 of inserter tube 40 (see FIG. 2), since rod 20 must be capable of passing into inserter tube 40 and cap 50 to threadably receive the valve stem 70. Forward end 25 of bar section 24 is internally threaded for receiving the threaded end 72 of valve stem 70, as will be shown.

Handle 30 is threadably attached to threaded rod section 22 through a matching threaded aperture not shown. Handle 30 is preferably molded from ABS plastic, and the aperture preferably has an internally threaded brass insert so that such handle may be turned easily on the threads of rod section 32. See FIG. 7. Spacers or bushings 32 and 34, also preferably made from ABS plastic, have a recessed portion 33 which, as will be shown, should have a diameter equal to the inner diameter 62 of split rod holder 60. Holder 60, also shown in FIG. 6, is preferably tubular in shape and machined from ABS plastic such that there is a cut-away portion or opening 66 in its outer wall sufficiently wide to facilitate placement of pulling rod 20 into such holder, although other suitable holders may be used. Aperture 36 extends at least partially through the bar section 24 of pulling rod 20, into which stud member 38, which can be simply a common nail, is inserted to prevent the holder 60 from turning in relation to the pulling rod 20 when the device is in use. Aperture 36 should be positioned generally nearer to the proximal end 23 of bar section 24 than to the distal end, so that member 38 will extend outwardly in or between the sides of opening 66 in the pulling rod holder 60 when a valve stem 70 is being pulled into the tube 40 and cap 50 as will be further shown and described.

FIGS. 2–5 illustrate the inserter tube and inserter tube cap of the invention, and their interconnection, in more detail, with FIG. 5 illustrating a tube and cap sized to fit a valve stem having slightly larger dimensions. As shown in FIG. 2, inserter tube 40 has a first reduced diameter end 42, middle section 44, and a second reduced diameter end, or insertion end, 46. First reduced diameter end 42 is sized to fit snugly into spacer 34, as shown in FIG. 9, while insertion end 46, having an inner diameter 47 and outer diameter 48, is sized to be received in the valve stem hole in a tire rim as shown in FIG. 10a as well as the inner end 52 of inserter tube cap 50 as shown in FIG. 4. Although inserter tube 40 is preferably machined from alloy aluminum, other suitable materials, such as ABS plastic, may be used.

FIG. 3 shows inserter tube cap 50 having an inner end 52 and outer end 54. The inner peripheral wall 56 of cap 50 is inwardly tapered starting at outer end 54 and ending at edge 55. The diameter of inner peripheral wall 56 from inner end 52 to edge 55, designated as 57, is just slightly greater than or equal to outer diameter 48 of the insertion end 46 of tube 40, such that when the end of tube 40 is received into cap 50 up to edge 55 as shown in FIG. 4, a continuous surface between the inner wall 56 of cap 50 and the inner wall 47 of tube 40 is created. Such arrangement is important to the proper working of the invention so that valve 70 can be easily pulled through cap 50 into tube 40 without encountering an edge or the like which could impede such pulling and possibly tear or otherwise damage the elastic casing of valve 70. While it would be possible for the internal diameter, or ID, of inserter tube 40 to be slightly larger than the lower ID of the cap 50, it is better if the two IDs are exactly matched, and in no event can the ID of the inserter tube 40 be any significant degree greater than the ID of inserter tube cap 50. Valve stem 70 is shown in FIG. 4 oriented as it will be pulled into the insertion tube 40.

The exact matching dimensions of the inside diameter of inserter tube 40 and cap 50 are dependent upon the dimensions of the valve stem to be inserted. Generally, there are two standard sized valve stems for tubeless tires; a 29/64" valve stem and a ⅝" valve stem. The inventor illustrates in FIGS. 4 and 5 an inserter tube 40 and cap 50 to accommodate both such valve stems, although of course alternative inserter tubes could be machined to accommodate non-standard sized valve stems which are either smaller or larger than the standard sizes. In FIGS. 2–4, inserter tube 40 and cap 50 are dimensioned to accommodate a valve stem such as Model No. TR-414, or a 29/64" stem, although such tube 40 and cap 50 may be used with valve stems having slightly larger and smaller dimensions, depending upon the diameter of the rim hole in the tire rim. However, FIG. 5 shows a second inserter tube 140 and cap 150, similar to that shown in FIG. 4, sized to receive valve stem Model No. TR-415, or a ⅝" valve stem, which valve is slightly shorter and wider than Model No. TR-414. Due to the slightly greater dimensions, first end 142 will not fit into spacer 34, which is used to secure the inserter tube 40 shown in FIG. 2 in holder 60. However, a spacer 134 may be provided and snugly fitted over first end 142 before the valve 170 is threadably attached to rod 20 and the device is placed in holder 60. Alternatively, the spacer 134 may be machined integrally with the end of the inserter tube 140. The inside diameter of an inserter tube for inserting a 29/64" valve stem is approximately 0.413 inches, while the inside diameter of an inserter tube for inserting a ⅝" valve stem is approximately 9/16". Of course, different sized spacers 34 or 134 may be provided to accommodate such different sized inserter tubes 40. Other inserter tubes and caps may be provided having an inside diameter sized to accommodate valve stems of different sizes.

Tapered inserter tube cap 50, shown in FIG. 3, is preferably approximately at least ⅝" in length. The inventor has found through trial and error that a length of approximately at least ⅝" allows for the angle of the taper or side wall angle to be such that sufficient lubricant is pulled along the tapered portion so that the valve stem 70 can be easily pulled through such cap using the inserter device 10 of the invention. A length of slightly longer than ⅝" allows the angle of the taper or side wall angle to be slightly less, thereby making it somewhat easier to pull the valve stem through the cap. However, in most cases it is not preferred that the cap 50 be longer than approximately 2 inches, since this will simply add to the length of time it takes to pull the valve stem through the cap without significantly increasing the ease of such pulling. An acceptable angle of the taper of the inserter tube cap 50 has been found to be approximately ten (10) degrees, although cap 50 may have an angle of taper more or less than ten (10) degrees. The preferred angle will depend upon factors such as the amount of lubricant used, the size of the valve stem to be installed, the length of the inserter tube cap, and other factors. Cap 50 is preferably manufactured from ABS plastic, although other suitable materials may be used. As with the inserter tube 40, the inner diameter 56 and 57 of the cap 50 depends upon the size of the valve stem to be inserted. Note in FIGS. 3 and 4 that in any case the inside of cap 50 is tapered inwardly from second end 54 to edge 55, and that first end 52 is machined to receive insertion end 46 of the inserter tube 40 such that when insertion end 46 is secured in first end 52, the inner diameter 47 of the inserter tube 44 is flush or even with the inside diameter 56 of cap 50 such that a valve stem 60 being pulled first into the cap 50 and then into the inserter tube 40 will not catch on any edges or be otherwise damaged.

Figure 7:
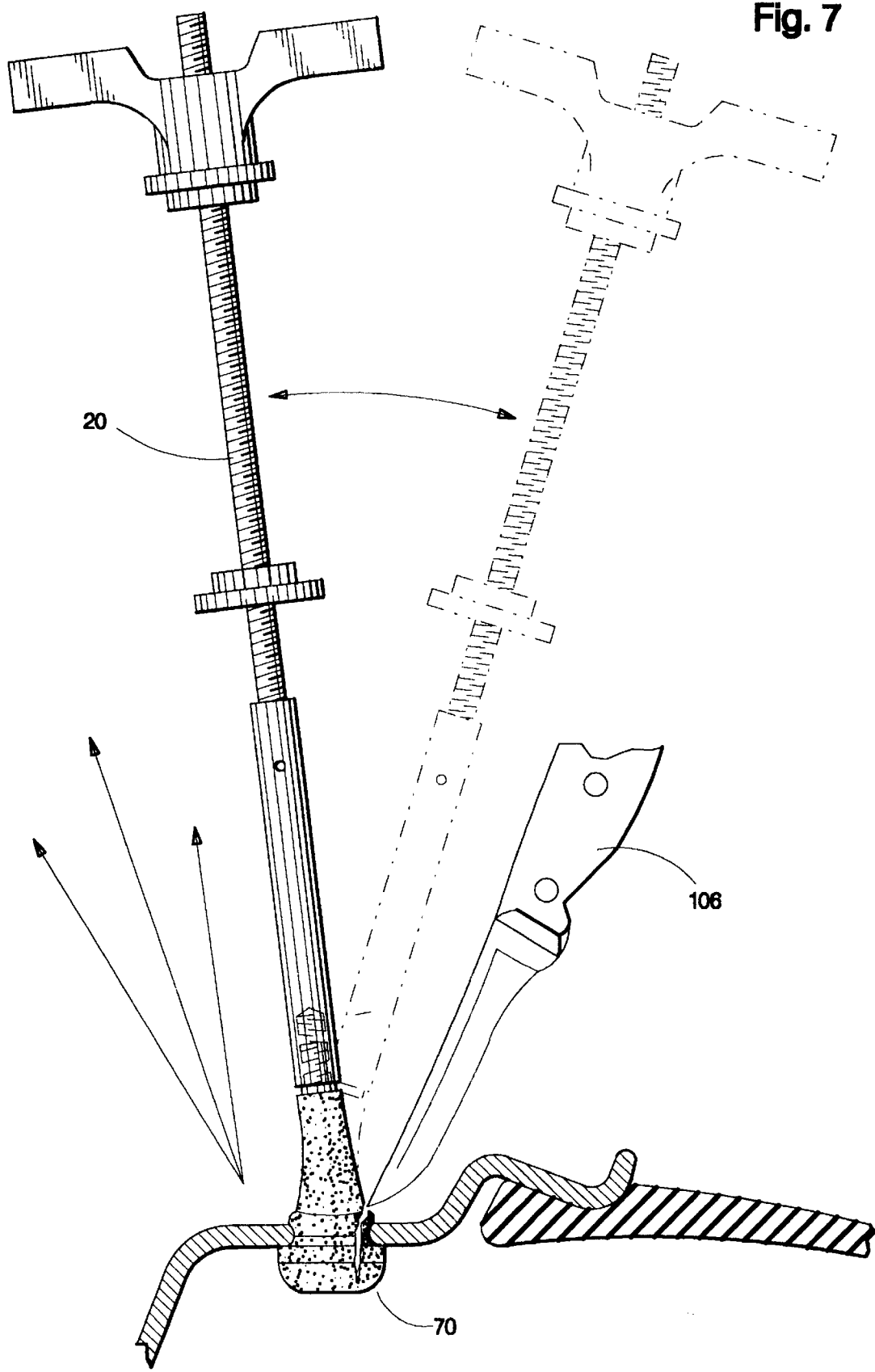
FIG. 7 is perspective view of the tool being used to remove a valve stem from the rim of a tire.

Pulling rod holder 60, shown in FIG. 6, is designed to provide an end surface against which handle 30 can be turned to pull valve stem 70 through the tapered cap 50 and into inserter tube 40. Holder 60 in the preferred embodiment is comprised of an approximately 5½" section of ¾ inch ABS plastic pipe having a cut-away section or aperture 66 in one side large enough so that the rod holder 60 can be easily slipped around rod 20 as shown in FIG. 9. Holder 60 is preferably tubular in shape and with an inner peripheral wall 62 having a diameter large enough to easily accommodate pulling rod 20. Although the holder 60 could be permanently attached to the rest of the inserter device 10, the use of a removable holder allows for less material to be used in manufacturing the inserter 10, since the inserter tube 40 and tapered cap 50 can be slid up over the pulling rod 20 while the valve stem 70 is being threaded to the threads 25. Not only does including the cut-away portion facilitate placing the holder around the pulling rod 20, but, as shown in FIG. 7, it provides a space into which member 38 can be inserted into aperture 36 so that the holder 60 will not turn in relation to the rod 20 when a valve stem 70 is being pulled into the inserter tube 40 and cap 50.

Before a new valve stem can be inserted into a tire rim, it will usually be necessary to first remove an old or existing valve stem from the wheel rim. As shown in FIG. 7, this can be accomplished using only the pulling rod 20, liquid soap or other lubricant (not shown), and a small knife such as an EXACTO® knife 106. First, a generous supply of lubricant is spread on the old valve stem and around the valve stem or rim hole 102 in rim 100, rotating or bending the old valve stem so that the lubricant is evenly spread around the rim hole 102. Next, the pulling rod 20 in screwed onto the old valve stem, and upward manual force "f", shown by the arrows, is applied on the rod 20 through the handle 30, tending to cause the old valve stem 70 to be pulled or stretched. While stretching the old valve stem 70 in a generally upward and lateral direction, blade 106 may be slipped into the rim hole 102 and, as best shown in FIG. 8, the rubber flange 74 of the old valve stem can be cut. More than one cut can be made if desired. Cutting the rubber flange 74 further decreases the stability and rigidity of the old valve stem and allows it to be pulled out of the rim hole 102 using less force on the pulling rod 20 than would otherwise be required. Once the old valve stem has been removed, it is then unscrewed from the pulling rod, and a new valve stem may be inserted using the device as described below.

FIG. 9 is a side view of the inserter tool 10 with a valve stem 70 threadably secured to the forward end 25 of bar section 24 of pulling rod 20 and with the holder 60 surrounding the pulling rod 20. Prior to threading the valve stem 70 to rod 20, lubricant such as liquid soap should be liberally applied around the outer taper and end flange of the new valve stem 70 as well as on the interior walls of the inserter tube 40 and tapered cap 50. Such lubricant substantially decreases the friction created between the stem 70 and the inserter mechanism when pulling the valve stem into the inserter tube and cap, and in addition, ensures that the valve ultimately will easily slide out of such tube and into the rim hole. After the lubricant is applied, the forward end 25 of pulling rod 20 is placed in and slid through the first end 42 of inserter tube 40 and inner end 52 of tapered cap 50, and is threadably connected to the valve stem 70. Inserter tube holder 60 is then positioned between bushings or spacers 32 and 34 around pulling rod 20, and the pulling rod handle 30 is turned in a clockwise direction until such bushings tighten around the holder 60. Next, stud member 38 is placed in aperture 36 in the bar section 24 to prevent rod 20 from turning in relation to the holder 60 while the new valve stem 70 is pulled into the inserter tube 40. This is substantially the position shown in FIG. 9.

Handle 30, which is threadably secured to the inserter rod 20, is then further turned in a clockwise direction, causing such handle to gradually push against spacer 32, thereby causing pulling rod 20 to be slowly and evenly pulled upwardly in relation to the inserter tube 40 and tapered cap 50, which is prevented from moving upwardly by the holding member and bushings. This in turn causes the new valve stem 70 to be pulled upwardly into the tapered cap 50 and eventually completely through the tapered cap 50 into the inserter tube 40 as shown in FIG. 10. As the valve stem 70 is pulled into the tapered cap 50 and inserter tube 40, the rubber flange 74 on the valve stem is uniformly compressed. Preferably, the stem should only be pulled into the inserter tube 40 just far enough so that it has passed completely through the tapered cap 50 so that flange 74 is positioned just inside the insertion end 46 of the tube 40 (FIG. 10).

Once the valve stem 70 has been pulled completely into the inserter tube 40, member 38 is removed and handle 30 is turned in a counterclockwise direction, thereby loosening the bushings around holder 60 so that it can also be removed. Preferably, handle 30 should be rotated until it almost reaches the far end of the threaded rod 22, which it is believed makes it more comfortable to place manual pressure on the handle 30 in pushing the new valve stem 70 into the rim hole, as described below. Tapered cap 50 is also removed, leaving the stem ready for insertion into the rim hole.

As shown in FIG. 10a, the final step, using only manual force, is to install the new valve stem 70 into rim hole 102. First, the insertion end 46 of tube 40 is situated in the rim hole 102 such that the rod 20 is substantially perpendicular to the rim hole. Next, manual force is applied in a downward direction, indicated by the downward arrow "f" in FIG. 10a., on the handle 30 and insertion rod 20, thereby causing valve stem 70 to be pushed out of the inserter tube 40 and into the rim hole 102 of rim 100. Once the new valve is pushed completely out of the tube 40, upward pressure should then be applied on rod 20 using handle 30 until the valve "snaps"

into place in the rim hole 102 as shown in FIG. 12 and indicated by the upward arrow. The pulling rod 20 can then be unthreaded from the valve stem 70 and removed, leaving the new stem seated in place on the tire rim.

As can be seen, using the inventor's preferred tool and method of operation, it becomes a very simple matter to remove an old valve stem and replace it with a new one. The present device has at least two primary advantages over or differences from known valve stem installing and replacing devices that allow a valve stem to be installed from the outer side of the tire rim. First, while all of such devices in the prior art known to the inventor require that the valve stem be gradually pushed down an elongated tapered tube or nozzle, which takes longer and is quite difficult to accomplish manually, using the present device the valve stem is pulled, rather than pushed, into the inserter tube. Such pulling motion using the inventor's device is quite effortless and is accomplished quickly and with little manual force required. A second advantage is the use of a separate tapered member or cap when pulling the valve stem into the insertion tube, which cap can be removed after the valve stem has been pulled completely into the inserter tube. Such tapered member or cap is relatively short in length, and thus very little time and effort is required to pull the valve stem through such cap and into the insertion tube in comparison with prior art devices requiring the valve stem to be pushed down a long tapered tube. In addition, because the insertion end of the inserter tube is dimensioned to fit directly into the rim hole, the device can then be quickly and easily placed into the rim hole and the valve stem pushed out of the inserter tube and then pulled into place in the rim hole using only manual force. Thus, the present invention eliminates many of the difficulties of prior art devices by providing a simpler and easier means changing a valve stem from the outer side of a tire rim.

While the handle 30 of the insertion rod 20 is shown as being merely threadably attached to such rod, it is also envisioned that a lever mechanism may be used to force the valve stem out of the tube 40 and into the rim hole. For example, once the valve 70 has been pulled into the insertion tube 40, rather than using the rod 20 and handle 30 to push the valve stem 70 out of the tube 40 as shown in FIG. 10, such rod 20 can be unscrewed from the valve 70 and a second pivotable handle 150 threaded to or otherwise engaging the valve similar to that shown in FIG. 11. Handle member 150 preferably would contain a gripping area 152, a pivot 154, and a valve or pulling rod engaging area 156. Upward force applied on the gripping area 152 would force the valve engaging area 156 in the opposite direction, thereby forcing the valve stem out of the insertion tube 40 and into the rim hole. Of course, the valve would still then have to be pulled or "snapped" into place in the same manner as described above and illustrated in FIG. 12 prior to removal of the handle 150. Downward force applied on the pivot handle may also be used to "snap" the valve stem into place.

While the tool described above is the preferred embodiment of the prevention, FIGS. 13–18 illustrate another less preferred embodiment. Such version is different from the first described method in that it does not require a separate funnel or tapered attachment cap, as such tapered portion is integrally attached to the inserter tube. As shown in FIGS. 13a and 13b, different sized inserter tubes may be used depending upon the dimensions of the valve stem and the diameter of the rim hole just as in the previous embodiment. FIG. 13a illustrates an inserter tube 240a designed to fit a rim hole having a first diameter, while FIG. 13b illustrates an inserter tube 240b dimensioned to fit a rim hole having a slightly larger diameter. Of course, other inserter tubes having slightly different diameters for various sized valve stems may also be used. Outer ends 246a and 246b of tubes 240a and 240b, respectively, have a larger diameter than the outside diameters 247a and 247b of forward ends 242a and 242b respectively, and are adjacent to first and second reduced diameter sections 249 and 250. The inner peripheral wall 248 of tubes 240a and 240b is inwardly tapered along sections 246, 249, and 250. As described in more detail below, as valve stem 270 is pulled into tubes 240a and 240b by pulling rod 220, rubber casing 274 on the valve stem is gradually compressed until it is substantially disposed in section 242a and 242b ready for insertion into the rim hole. Since it is the opposite end of the insertion tube, however, that is sized for fitting into the rim opening in the wheel rim, it is necessary that the valve stem be pushed out of the other end of the inserter tube. See FIG. 15.

Figure 17:
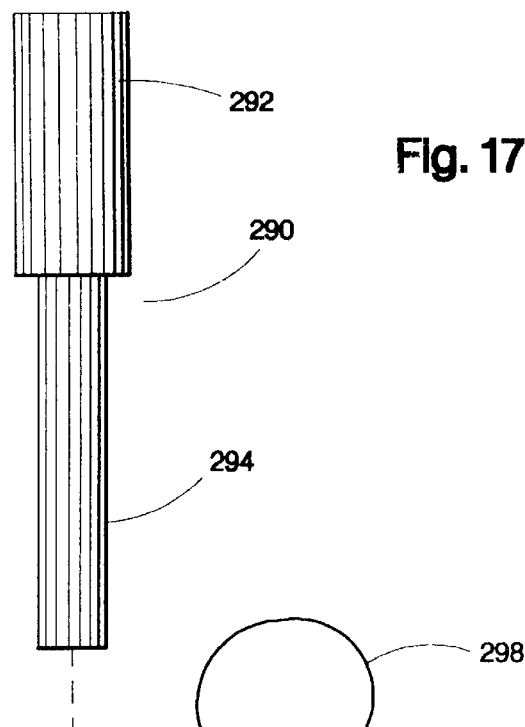
FIG. 17 is a view of one of the inserter tubes of the alternative embodiment of the invention positioned in a rim hole of a wheel rim with the pusher device positioned just above the inserter tube with an arrow indicating the direction the pusher device is pushed.
Figure 18:
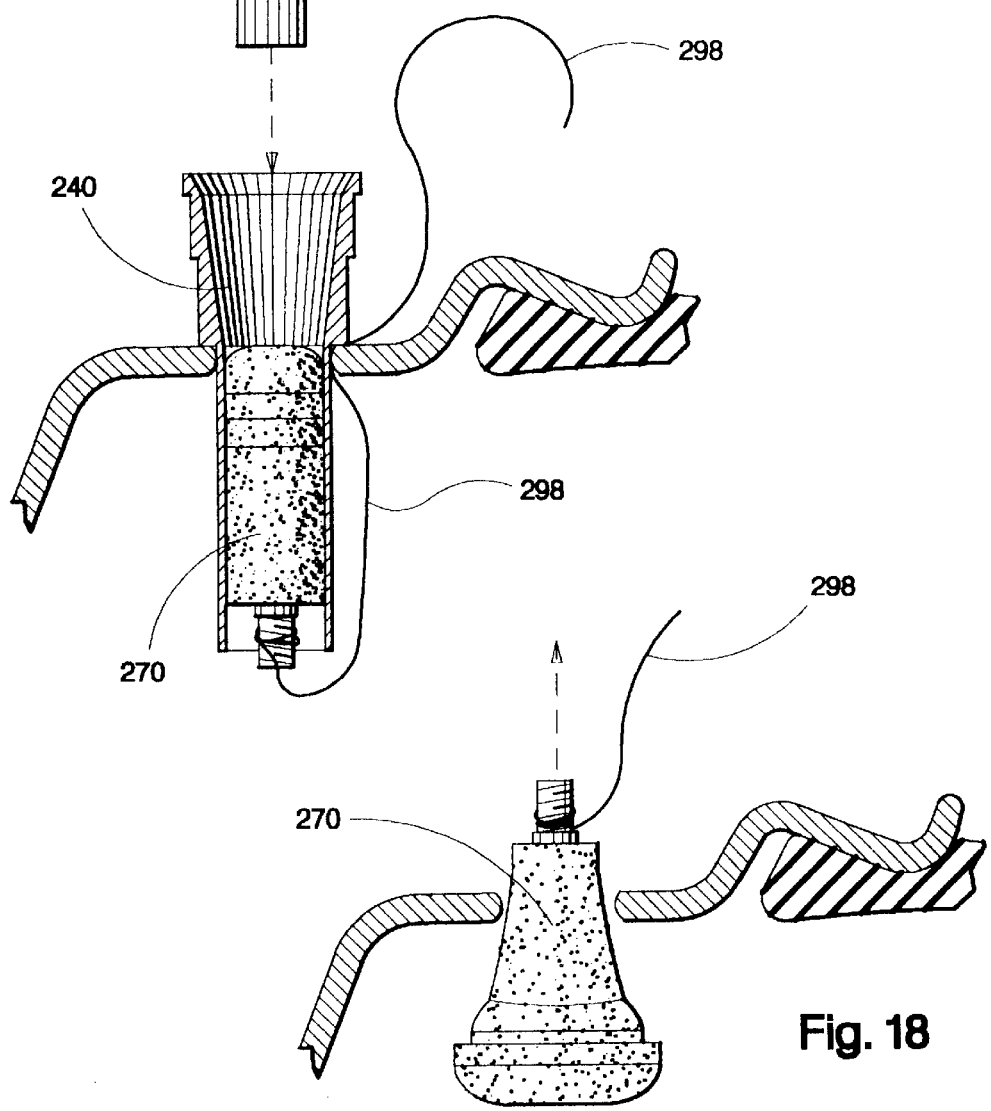
FIG. 18 is a view of the valve stem after the pusher device has been used to force the valve stem out of the inserter tube and into the tire rim and with the cord for pulling the stem into position in the rim hole for attaching the pulling rod as shown in FIG. 12 still attached.

A second difference from the first embodiment is the use of cord or line 298, shown in FIGS. 15 and 17–18, which cord is attached to the threaded portion of the valve stem 270 prior to inserting the stem into the rim hole. Using such alternative method, the forward end 247 of inserter tube is inserted in the rim hole, so that the threaded end of valve stem 270 enters the rim hole first and the valve stem must be flipped around prior to being secured in the rim hole. Cord 298 allows the valve stem to be automatically rotated or flipped around once it has been inserted into the tire, at which time the threaded portion of stem 270 is pulled back into the rim hole 106 by cord 298, secured to the pulling rod, and pulled or "snapped" into position in the rim hole in the normal manner.

To use such tool, first the old valve stem is removed in the same manner as shown and described above. To install a new valve stem 270, first the pulling rod 220 is placed into end 242 of the inserter tube 240, and new valve stem 270 is screwed onto the end of the pulling rod 220. Next, lubricant is spread over the valve stem and the inner wall 248 of the inserter tube 240. Pulling rod 220 is then placed in the pulling rod holder 260 between spacers 232 and 234 and is secured by turning handle 230 in a clockwise direction as shown in FIG. 14. Handle 230 is then continually turned in a clockwise direction, causing valve stem 270 to be pulled into the inserter tube 240 and compressing the rubber casing and flange on valve stem 270 so that it may be easily fitted into the rim hole. Valve stem 270 should be pulled approximately half-way through the inserter tube 240 so that at least the threaded tip of the valve stem is pulled completely through and is protruding out of the forward end 247 of tube 240. Pulling rod 220 is then unscrewed from the valve stem 270, and a thin cord 298, preferably made of nylon or other sufficiently strong, thin material, is tied or otherwise secured either to the threaded portion of the valve stem or to the valve stem cap shown in FIG. 15. Such cord 298 should be long enough so that it can extend into the tire rim hole 102 with sufficient excess length so that the cord 298 can be easily held by the user. If the cord 298 is attached to a valve stem cap, not shown, which is one way to secure the cord to the valve stem, such cap should now be attached to the threaded portion of the valve stem 270.

To insert the valve stem 270 into the tire rim, first approximately four to six inches of cord 298 is extended through rim hole 106, and the forward end 247 of inserter tube 240 is placed in the rim hole 106 adjacent to cord 298 as shown in FIG. 17 such that the threaded portion of the valve stem 270 extends downwardly into the wheel rim. Inserter tube 240 cannot slip all the way into the rim hole 106, as portions 249a or 250a have a diameter larger than the diameter of the rim hole, and the tube can be rested against the rim against either of such increased diameter portions. Downward force is then applied on valve stem 270 using pusher device 290, shown in FIGS. 16 and 17. As shown in FIG. 16, pusher 290 is preferably cylindrical in shape, and has a larger diameter portion 292 which serves as the handle for the pusher, and a reduced diameter portion 294, which diameter is slightly less than the inner diameter 248 of the inserter tube 240. Reduced diameter portion 294 is slid into the end of the inserter tube 240 protruding from the rim hole 106 until it contacts the rear surface of the valve stem flange. Sufficient downward pressure is then applied on the pusher device to push valve stem 270 out of tube 240 and into the wheel. However, although the inventor has provided a separate pushing rod, it should be understood that the distal end of the pulling rod may also be used to push the valve stem out of the tube 240 and into the wheel. Once the valve stem has been pushed into the wheel, inserter tube 240 and pusher 290 are removed. Valve stem 270, which is now held dangling in the tire by cord 298 as shown in FIG. 18, will automatically be inverted since cord 298 is tied to the threaded end of the stem. The valve stem is now pulled upwardly back through the rim hole by cord 298 until the threaded portion is protruding through the rim hole. Finally, pulling rod 220 is again threaded to valve stem 270, and upward pressure is applied on the pulling rod until the valve stem 270 "snaps" into place in the rim hole as shown in FIG. 12. Pulling rod 220 is then removed, leaving the new valve stem 270 in place in the rim hole.

While the method just described utilizes the pulling rod to pull the valve stem into the inserter tube similar to the first described embodiment, such method does not employ the separate tapered attachment described in the first embodiment. Instead, the tapered nozzle portion is integrally machined with the inserter tube. Thus, it is necessary to insert the valve stem in an inverted orientation and then flip it around inside the tire so that the threaded portion is facing upwardly. It is also necessary to thread the puller rod to the valve stem twice instead of only once. While the second method just described requires the additional step of tying a string to the valve stem cap or threaded portion of the valve stem, as well as threading the puller rod to the valve stem twice instead of once, such method is still relatively simple to perform and illustrates a variation for using the tool. The second embodiment has the advantage of requiring only a single insertion tube instead of an insertion tube plus an insertion tube cap. Both embodiments provide simple easy-to-operate tooling which may be provided for emergency use in a kit kept easily available in a motor vehicle for emergency use and in a home or garage, and, once taught or explained to a potential tire stem changer, are simple and easy to practice or implement.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. An apparatus for inserting and removing a valve stem from the rim opening of a tubeless tire comprising, in combination:

an elongated rod;

a tubular member defining a chamber through which the elongated rod may pass, said tubular member having a first portion and a detachable end connectable to the first portion, the detachable end having a tapered inner diameter that converges toward the first portion, said tubular member also having means for alternately connecting the first portion with the detachable end and with the rim opening;

securing means on one end of said elongated rod for engaging a said valve stem; and a drawing means for drawing said valve stem engaged with the one end of the elongated rod into said chamber, the elongated rod being disposed for slidable movement within said chamber.

2. The apparatus as defined in claim 1 wherein at least one end of said tubular member has an external diameter dimensioned to fit into a tire rim opening.

3. The apparatus as defined in claim 1 wherein said first portion has an upper end and a lower detachable-end-engaging end, and with the lower detachable-end-engaging end having an external diameter dimensioned to fit into the rim opening of a said tire.

4. The apparatus as defined in claim 1 wherein the elongated rod has a first end and a second end, said rod having external threads at its first end and wherein the second end includes the securing means for engaging said valve stem.

5. The apparatus as defined in claim 4 additionally comprising an internally threaded handle for engaging the external threads of the elongated rod.

6. The apparatus as defined in claim 5 wherein said handle includes a lever mechanism.

7. The apparatus as defined in claim 4 wherein said drawing means comprises a holding member for engaging tie elongated rod, said holding member secured to the elongated rod by a pair of bushings which are secured to the ends of the holding member, and an internally threaded handle for engaging the external threads of the elongated rod.

8. The apparatus as defined in claim 1 additionally comprising a cutting means for cutting the flange on an old valve stem to facilitate removing of such old valve stem from a tire rim.

9. A tool for installing and replacing valve stems from the rim opening of a tubeless tire comprising, in combination:

(a) an elongated rod having an externally threaded end and also having an internally threaded end for engaging threads on a said valve stem;

(b) a handle having an internally threaded aperture for engaging the externally threaded end of the elongated rod;

(c) a first tubular member having a first end, a second end, and an inner diameter defining a passageway therethrough, through which passageway said elongated rod is configured to pass, said second end having an external diameter substantially equal to the diameter of a valve stem rim opening in a wheel;

(d) a second tubular member having two ends and an interior wall which is tapered on one end and has an internal diameter on its other end substantially equal to the external diameter of the outer end of the first tubular member such that the first and second tubular members are connectable to one another;

(e) a holding member for indirectly engaging the elongated rod, said holding member secured to the elongated rod by a pair of bushings which are secured to the ends of the holding member;

(f) a means to prevent the holding member from moving in relation to the elongated rod (g) and means for drawing the elongated rod relative to the holding member.

10. A tool for installing and replacing valve stems as defined in claim 9 wherein the elongated rod is comprised of an externally threaded rod section and a bar section, the externally threaded rod section being attached on one end to said bar section, said bar section having the internally threaded aperture on its opposite end for engaging the threads of the valve stem.

11. A tool assembly for placement of a valve stem in a tubeless tire rim comprising:

(a) a first tubular member having a reduced external diameter insertion end adapted for insertion into a valve opening in the tire rim and having a cylindrical interior;

(b) a second tubular member removably connectable at one end thereof to the reduced diameter insertion end of the first tubular member and having a taper in the other end thereof converging toward said one end;

(c) an elongated member extendable through the first and second tubular members and having a tire valve thread engaging means at one end, and (d) means to forcibly draw the elongated member through the first and second tubular members to seat the tire valve in the cylindrical interior of the first tubular member in a position to be forced from the first tubular member partially through the valve opening in the tire rim upon removal of the second tubular member from the first tubular member and insertion of the reduced external diameter insertion end into the valve opening.

12. A tool assembly in accordance with claim 11 wherein the means to forcibly draw the tire valve through the second tubular member into the first tubular member comprises threads on the elongated member adapted to interengage with a threaded handle.

13. An apparatus for inserting a valve stem into the rim opening of a tubeless tire comprising, in combination:

an elongated rod;

a reversible tubular member defining a chamber through which the elongated rod may pass;

securing means on one end of said elongated rod for engaging said valve stem;

a drawing means for drawing said valve stem engaged with the one end of the elongated rod into said chamber, the elongated rod being disposed for slidable movement within said chamber;

means for manually pushing the valve stem out of the tubular member and into said rim opening; and a cord securable to the threaded end of the valve stem prior to insertion of the valve stem into the tire rim.

14. The apparatus as defined in claim 13, wherein one end of said tubular member has an external diameter dimensioned to fit into a tire rim opening.

15. The apparatus as defined in claim 14, wherein the other end of said tubular member is internally inwardly tapered.

16. The apparatus as defined in claim 13, wherein the elongated rod has a first end and a second end, said rod having external threads at its first end and wherein the second end includes the securing means for engaging said valve stem.

17. The apparatus as defined in claim 14, additionally comprising an internally threaded handle for engaging the external threads on the first end of the elongated rod.

18. The apparatus as defined in claim 17, wherein said drawing means comprises a holding member for engaging the elongated rod, said holding member detachably secured around the elongated rod by a pair of bushings which are secured to the ends of the holding member, and said internally threaded handle.

19. The apparatus as defined in claim 17, wherein said handle includes a lever mechanism.

20. The apparatus as defined in claim 13, additionally comprising a pusher rod for manually pushing the valve stem out of the tubular member and into a tire rim.

21. The apparatus as defined in claim 13, wherein said means for manually pushing the valve stem out of the tubular member and the rim opening in the tire rim is a pusher rod.

* * * * *